United States Patent [19]
Seidl et al.

[11] Patent Number: 6,148,306
[45] Date of Patent: Nov. 14, 2000

[54] DATA STRUCTURE FOR SCHEDULED EXECUTION OF COMMANDS IN A FACILITIES MANAGEMENT CONTROL SYSTEM

[75] Inventors: Neal John Seidl, New Berlin; August Antony Divjak, Waukesha, both of Wis.; Uday Ramchandra Kelkar, Grayslake, Ill.

[73] Assignee: Johnson Controls Technology Company, Plymouth, Mich.

[21] Appl. No.: 09/087,246

[22] Filed: May 28, 1998

[51] Int. Cl.[7] .................................................... G06F 17/30
[52] U.S. Cl. .......................................... 707/104; 707/100
[58] Field of Search ...................... 707/100, 101, 707/102, 104; 710/6, 5, 22, 23, 24; 712/32, 225

[56] References Cited

U.S. PATENT DOCUMENTS

| | | | |
|---|---|---|---|
| 5,241,814 | 9/1993 | Butler ...................................... | 60/39.08 |
| 5,581,478 | 12/1996 | Cruse et al. .............................. | 364/505 |
| 5,793,646 | 8/1998 | Hibberd et al. .......................... | 364/505 |
| 5,931,160 | 8/1999 | Gilmore et al. ................... | 128/204.21 |
| 5,999,930 | 12/1999 | Wolff ........................................... | 707/8 |

*Primary Examiner*—John Breene
*Assistant Examiner*—Greta Robinson
*Attorney, Agent, or Firm*—Quarles & Brady LLP; George E. Haas

[57] ABSTRACT

An apparatus enables a controller to be programmed without being dependent upon a particular type of programming tool. This independence is accomplished by providing data structures in the controller which define a table of executable commands along with a set of rules associated with use of each command. Upon being connected to the controller, a programming tool downloads the valid commands and command usage rules for that particular controller. This enables a generic programming tool to be used with a variety of controllers that have different commands and usage rules. For a facilities management system, the controller stores a plurality of daily control strategies which specify events that call for execution of a particular sequence of commands.

20 Claims, 8 Drawing Sheets

DATA STRUCTURE FOR SCHEDULED EXECUTION OF COMMANDS IN A FACILITIES MANAGEMENT CONTROL SYSTEM

BACKGROUND OF THE INVENTION

1. Technical Field

The present invention is directed to a system for programming a data structure for use with an environment control system. More particularly, the present invention is directed to a system and variable size data structure for storing and validating scheduling strategy information for use by a controller-independent scheduling algorithm for generating an environment control system schedule.

2. Discussion

Environment control systems and facility management systems are well known in the art and are employed in office buildings, manufacturing facilities, and other large commercial and retail structures for controlling the internal environment of the facility. For example, in a heating, ventilating, and air conditioning (HVAC) system, one or more air handling units provide conditioned air to a variety of controlled air units, such as variable air volume (VAV) units, unitary devices (UNT) and damper systems through a ductwork system. The ductwork system also provides the environmentally controlled air to the internal environment of the facility. The operation of the air handling units and controlled air units is managed by an automatic controller which is capable of executing a variety of functions.

A significant benefit of the controller is that it can be programmed for obtaining maximum efficiencies with respect to the energy costs associated with operating the environment control system or facility management system. For example, the controller may perform various functions according to a preprogrammed schedule which includes periods of time when the facility is occupied and unoccupied during each week. The schedule may also include holidays and other exceptions. The controller can then follow the schedule for automatically adjusting the temperature of various zones within the facility, turning off large banks of lights, or securing sections of the facility.

For convenience in programming the controller, an interface or programming tool must be utilized for defining the schedule of operation, and functions to be performed during each strategy within the schedule. The controllers presently known within the art typically utilize a proprietary interface or programming tool which is only compatible with that particular controller. As such, the programming tool contains all of the functions and scheduling parameters which can be executed by its associated controller. More specifically, the tool contains each executable function, a set of rules defining when and how the function can be executed, as well as parameters defining the complexity of the schedule which can be implemented by the particular controller. The programming tool also includes an algorithm for defining the control strategies within the schedule based upon interpreting and applying the rules associated with each function. As such, the operator is limited to using the particular tool for that controller to program the schedule within the controller. Moreover, a change made to the controller also requires a corresponding change to the programming tool.

As will be appreciated, the proprietary nature of these known designs presents several problems within the art. For example, a larger environment control system with several controllers, each having different levels of features or options requires more than one programming tool for defining the various control strategies and operating schedules. This in turn increases the cost of operating the environment control system. Moreover, the operator must become familiar with the operation of each programming tool. Such an environment control system might be found in a specialized manufacturing facility. Another problem is that when one of the controllers within the environment control system is upgraded or replaced with a newer model, a new programming tool which is compatible with the upgraded controller must also be purchased.

In view of these problems recognized within the prior art, it is desirable to provide a controller which is not dependant upon a proprietary programming tool for defining the control strategies within the schedule of operation. It is further desirable to provide several different models of controllers which offer various function groupings ranging from simple to robust which are all compatible with the same programming tool. For example, this would allow a specialized manufacturing facility to utilize a simple controller with limited functions in one area of the facility, and an enhanced controller with many functions for other areas of the facility, and program these different controllers with the same programming tool.

Additionally, it is desirable to provide a data structure for storing the executable functions or commands, along with a set of rules associated with each command, within the controller, as opposed to storing this information within the programming tool. This in turn allows only the universal rule application algorithm to be stored in and executed by the programming tool. Accordingly, this design would allow one programming tool to interpret and apply the rules and commands associated with many different controllers. Moreover, if the controller or commands associated therewith are upgraded or enhanced, the data structure would allow the existing programming tool to be used in creating the operating schedule for the new controller.

SUMMARY OF THE INVENTION

According to the teachings of the present invention, a memory for storing a data structure defining command data and schedule data for operating a controller is provided. The data structure includes a variable length command table data structure for storing a set of executable commands. Each of the commands includes at least one context rule for defining the use of the command with respect to a sequence of selected commands. The command table data structure includes a first variable representing a number of different daily strategies, and a second variable representing a number of commands which may be used within a strategy. A command identification field is also associated with each command in the command table data structure.

BRIEF DESCRIPTION OF THE DRAWINGS

The various advantages of the present invention will become apparent to one skilled in the art by reading the following specification and appended claims, and by referencing the following drawings in which:

DETAILED DESCRIPTION OF THE PREFERRED EMBODIMENTS

The present invention is generally directed to a memory for storing a data structure defining the commands and rules associated with an HVAC controller, as well as a method in which a generic algorithm interprets the commands and rules for defining the controller's operating schedule. While the present invention is disclosed within the context of an HVAC controller for operating an environment control system, it will be readily appreciated by one skilled in the art that the data structure and method of the present invention are equally applicable to a variety of controllers and automatic control systems, including but not limited to lighting controllers and security controllers in building management systems.

Figure 1:
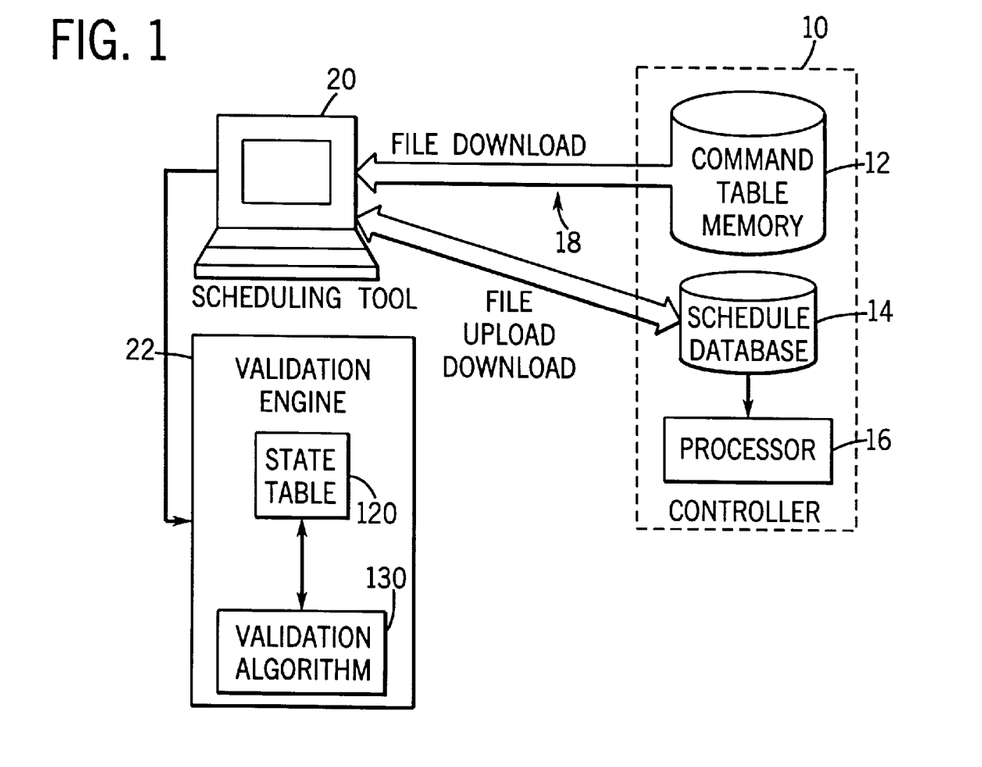
FIG. 1 is a data flow diagram showing the interaction between the data structure, the programming tool, and the scheduling database associated with the controller according to a preferred embodiment of the present invention.

Referring now to FIG. 1, the system associated with the data structure, and the flow of data during the schedule programming sequence is shown. More specifically, HVAC controller 10 is disclosed as having a memory 12 for storing the command table data structure according to a preferred embodiment of the present invention. Controller 10 also includes a schedule database 14 for storing the schedule and its associated command strategies which are programmed by the system operator. A processor 16 contained within controller 10 is responsible for reading schedule information from schedule database 14 and executing the appropriate command strategy for operating the environment control system.

A bidirectional interface 18 is provided so that controller 10 can communicate with an external scheduling tool 20. It is preferred that interface 18 comprise one of several standard computer interfaces, such as a serial interface which provides bi-directional data communication via an external port (not shown) on controller 10. However, one skilled in the art will appreciate that interface 18 could also be a network style interface, such as one conforming to the LonMark® network standard, if multiple controllers 10 are connected to a common network. Additionally, almost any type of peer-to-peer network which provides multiple access nodes can be utilized for interface 18. Preferably scheduling tool 20 is a hand held or laptop style computing device having a processor which is capable of communicating with controller 10 via interface 18. The scheduling tool 20 is responsible for implementing the validation engine 22 of the present invention. As shown, the validation engine controls and calculates a state table 120, and implements a validation algorithm 130. It should also be understood that the validation engine within the scheduling tool 20 includes a user interface which allows the system operator to program the scheduling sequence implemented by controller 10.

In operation, scheduling and programming tool 20 is used to download the controller specific command table 30 from memory 12, and download the current strategy and schedule tables 60, 80 from database 14, as shown in FIG. 1. The command table 30 contains all of the commands which can be executed by controller 10, as well as a set of context rules associated with each command. Through the validation engine 22 FIG. 1 the system operator is then able to create or edit the schedule via the user interface hardware scheduling of the tool 20. This scheduling process implemented by the validation engine, as well as the state table 120 and its associated validation algorithm 130 will be described in greater detail below. As the system operator creates or edits the schedule (within the memory of programming tool 20), the algorithm implemented by the scheduling tool 20 checks the context (or use within the scheduling sequence) of each command selected into a strategy for validity. After a validated set of strategies and an operating schedule has been constructed within scheduling tool 20, they are uploaded and stored within schedule database 14 for execution by processor 16.

Figure 2:
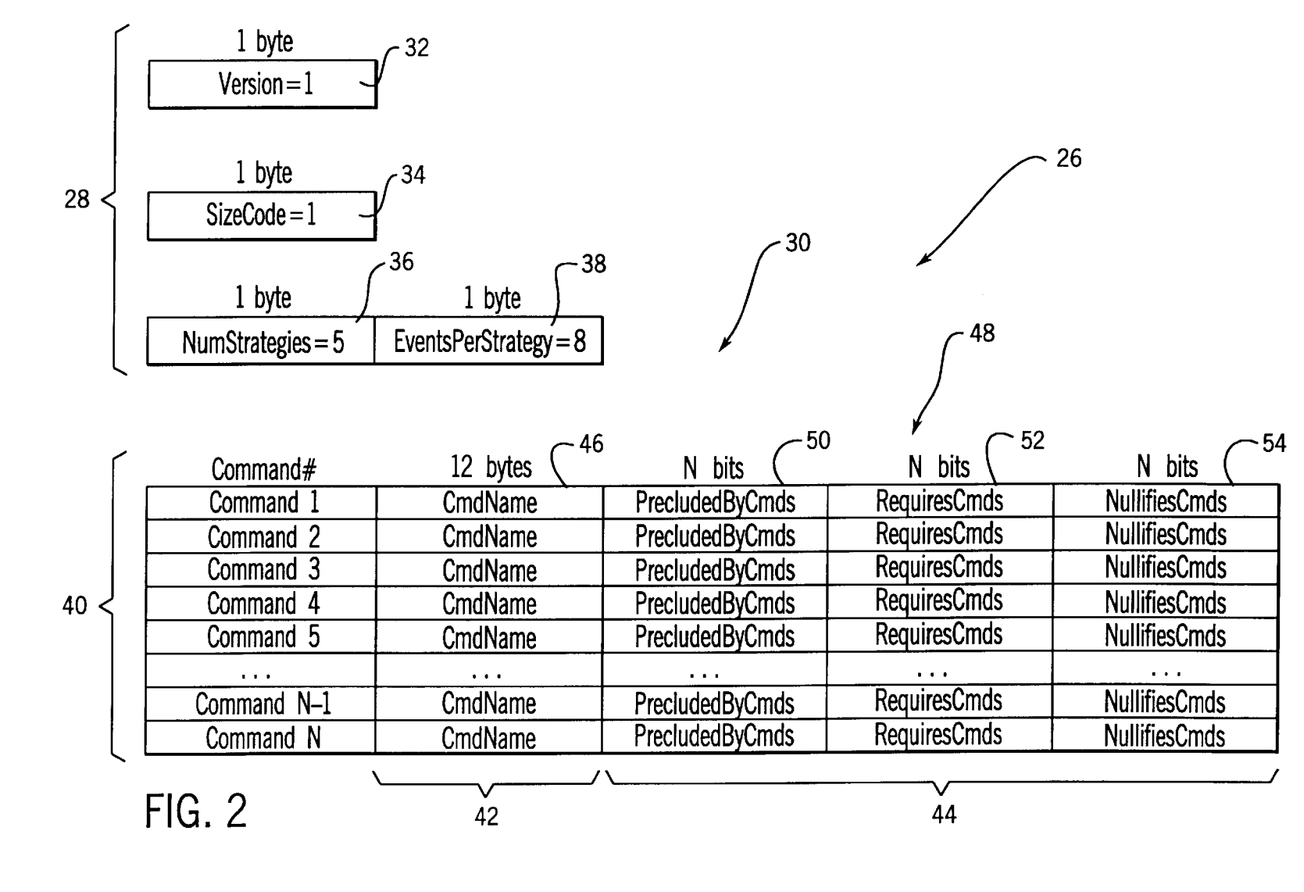
FIG. 2 is a diagram of the command table data structure also according to the preferred embodiment of the present invention.

As will be appreciated from FIGS. 1 and 2, the scheduling tool 20 associated with the present invention provides several improvements and benefits over the prior art. According to the present design, all of the command and rule context information is stored within memory 12 of the controller 10. Only the rule checking algorithm, which is compatible with a variety of controllers 10, is stored and executed by the scheduling tool 20. Accordingly, because all of the controller-specific commands, and the command schedule information resides in the controller's command table 30, a general purpose tool, such as scheduling tool 20, can be utilized for creating and editing strategies and schedules for any controller without storing a proprietary database of controller specific information, commands, and rules within the scheduling tool 20. Moreover, this scheme eliminates the need to constantly update or replace the scheduling tool as new controllers are released. This design is made possible by the data structure 26 defining the command table 30, and the coding technique which allows the most common context rules encountered with scheduling controller commands to be coded in a common and simple format with minimal memory requirements.

With reference to FIG. 2, the command table data structure 26 is disclosed. The command table data structure 26 of the present invention is a variable size data structure in which the size is selected in conjunction with the number of features or options designed into controller 10. The command table data structure 26 stores a set of commands 40 which are executable by the controller 10 for operating the environment control system. In the preferred embodiment, the environment control system is a rooftop HVAC system which is operated by a controller, such as the OCM-1272 programmable rooftop controller manufactured by Johnson Controls, Inc.

Figure 3:
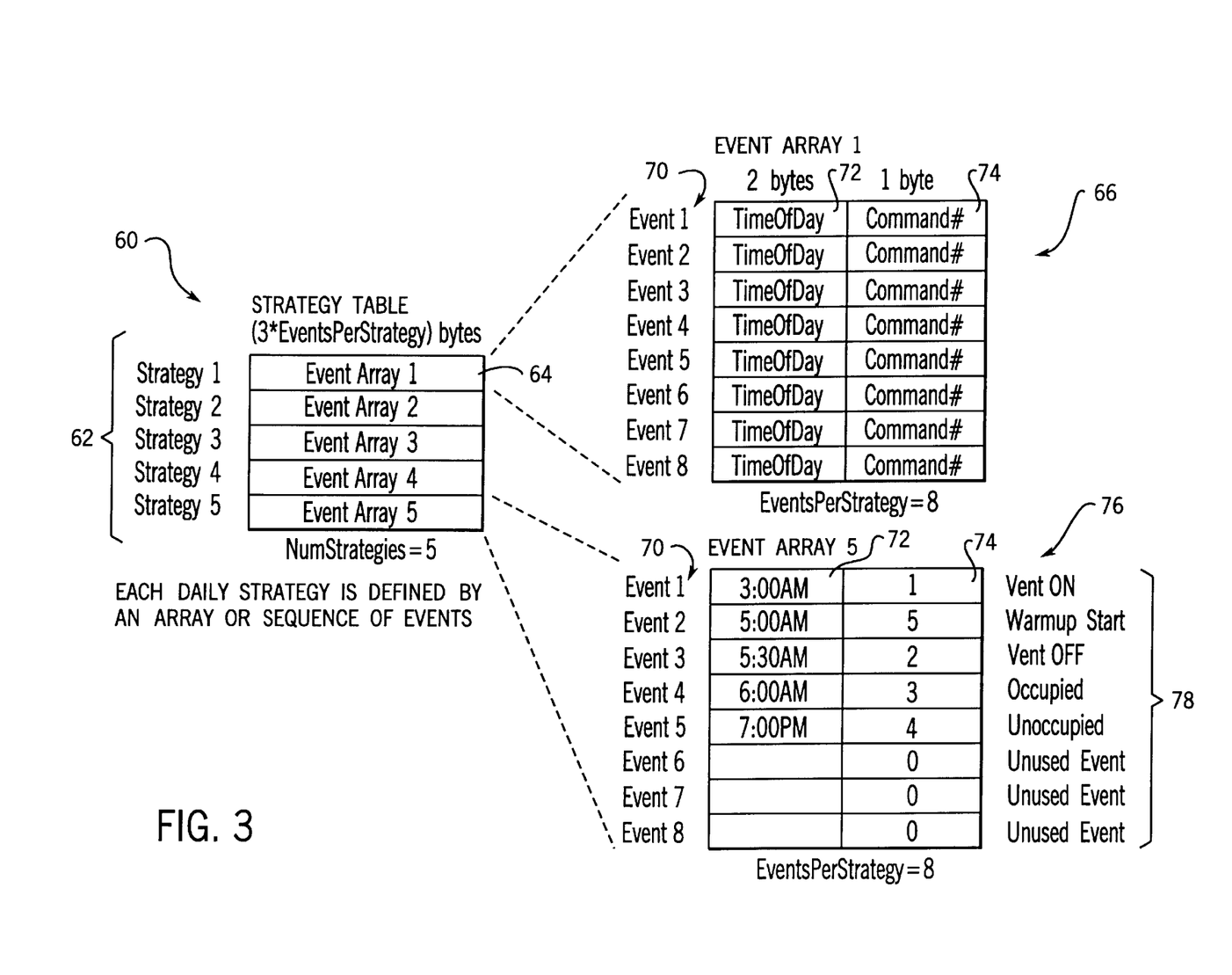
FIG. 3 is a diagram of the strategy and event data structure for storing a series of commands organized into events.

As shown, the command table data structure 26 includes a parameters header 28 for storing the variables which define the sizing of the command table 30. More particularly, the parameters header 28 includes a one byte version information field 32 which stores the assigned version of data structure 26. A command table SizeCode variable 34 defines the maximum number of commands 40 which can be stored within command table 30. The length of command table 30 is defined by N, a variable representing the number of different commands which are defined or programmed into a particular controller. As disclosed, valid lengths N are defined by 8×SizeCode, where the allowed integer values for SizeCode range from one (1) to sixteen (16). The parameter header 28 also includes a one byte NumStrategies variable 36 which defines the maximum number of strategies which may be created within the strategy table 60 (FIG. 3). The NumStrategies variable 36 also informs programming tool 20 how many different daily strategies are supported by controller 10. A one byte EventsPerStrategy variable 38 informs scheduling tool 20 how many different events may be defined within one daily strategy. As disclosed by the present invention, a command is a function executed by the controller 10, an event is a command which is executed at a particular time of day, and a strategy is a series of validated events which are executed in sequence by the controller.

The command table 30 is defined by a set of individual command records 40. The maximum number of command records 40 which can be stored within command table 30 is determined by the command table length variable N (or 8×SizeCode 34). Therefore, the maximum number of command records 40 is a multiple of eight as described above. Additionally, all of the bit arrays associated with commands 40 are sized in bytes and are byte aligned so that command table 30 can be implemented using standard electronic components. Each command record 40, as designated by a different command number (Command #) 41 between 1 and N, is comprised of a command name field 42 and at least one context rule field 44. As disclosed, each command name field 42 is a twelve byte field which stores the CmdName string 46 and serves as the primary identifier for each command table record 40. Each CmdName string 46 stores up to a twelve character command name which is used by the controller independent scheduling tool 20 for displaying the command name within the user interface.

Preferably, each command record 40 within command table 30 includes three context rule fields 44 for storing the context rules 48. As shown, the context rules 48 include a PrecludedByCmds rule variable 50, a RequiresCmds rule variable 52 and a NullifiesCmds rule variable 54. Each context rule 48 is represented as an N bit array where N is also the length of command table 30. Thus, the data length of each context rule 48 is always the same as the number of command records 40. Each bit in the bit array represents a portion of the context rule associated with the command. The three rule variables 50, 52, 54 are utilized by the scheduling tool 20 during the schedule programming sequence. More specifically, the three rule variables 50, 52, 54 define the rules which the scheduling tool 20 must follow when building a daily strategy from sequences of the commands 40. The PrecludedByCmds field 50 is used to indicate which other commands, when active, preclude this particular command from being used within the daily strategy. Only one of the commands indicated (logical OR) must be active to preclude this command. The RequiresCmds variable 52 is used to indicate which other commands must be active for this particular command to be valid when used within the daily strategy. Again, only one of the commands indicated (logical OR) must be active to allow the command. Finally, the NullifiesCmds variable 54 specifies which commands, will be nullified or cancelled by the selection of this command.

Turning now to FIG. 3, the data structure strategy table 60 is shown. As disclosed, strategy table 60 is a single column of storage cells 62 which represents the set of daily strategies 64. The number of storage cells 62, or length of strategy table 60 is determined by the NumStrategies variable 36 (FIG. 1). As shown with the preferred embodiment, NumStrategies is set to five (5) so that strategy table 60 has five storage cells 62 and can support five different daily strategies 64. It is also preferred that each storage cell 62 is sized for storing three times the maximum number of EventsPerStrategy (3×EventsPerStrategy) bytes of information. Thus, in the preferred embodiment, each storage cell 62 is directly associated with twenty-four (24) bytes of data because the EventsPerStrategy variable 38 is set to eight (8) (FIG. 2). This arrangement of data associated with each storage cell 62 can be viewed as a twenty-four (24) byte event array 76. Thus, the length of each event array 66, or maximum number of event records 68 which can be defined within each event array is set by the EventsPerStrategy variable 38. As shown in FIG. 2, the EventsPerStrategy variable 38 sets the maximum number of events to eight (8). Alternatively, each storage cell 62 within strategy table 60 in FIG. 3 can hold an address or pointer 64 associated with a corresponding event array 66, 76. In either case, each event array 66, 76 contains a validated sequence of executable events. The scheduling tool 20 is used to program and validate the sequence of events according to the algorithm of the present invention. For purposes of this disclosure, an event is defined as a discrete command 40 (from command table 30) which is executed by controller 10 at a particular time of day. The algorithm implemented by scheduling tool 20 which performs the validation of each command 40 for programming the sequence of events within event array 66 will be discussed in more detail below.

Each event record within the event array 66 includes an event identifier 70, a two byte TimeOfDay field 72, and a one byte command number field 74. The primary function of the event identifier 70 is to operate as a primary key for the validated sequence of events. The TimeOfDay field 72 stores the time of day that the associated command 40 is to be executed. Finally, the command number field 74 stores the number for the command 40 associated with the individual event record.

An exemplary event array 76 associated with the fifth storage cell 62 or fifth daily strategy of strategy table 60 is shown with exemplary data stored in fields 70, 72, 74 for each event. For purposes of aiding this illustration, side notes 78 indicate the associated command name 42 to aid in further understanding the arrangement of the commands 40 stored within event array 76. As shown, only five events are defined within event array 76, even though a maximum of eight events can be defined within the array. The preferred embodiment does not require a minimum number of events. It is also preferred that the number zero (0) be entered into command field 74 to indicate the presence of an unused event record 68. Thus, as shown, event array 76 includes three unused events 68.

Once each event array 66 within strategy table 60 is defined by the operator, it is available for use within the schedule table 80 (described below). The scheduling database 14 associated with a particular controller 10 will allow the daily strategies 64, once defined, to be scheduled into a schedule table 80.

Figure 4:
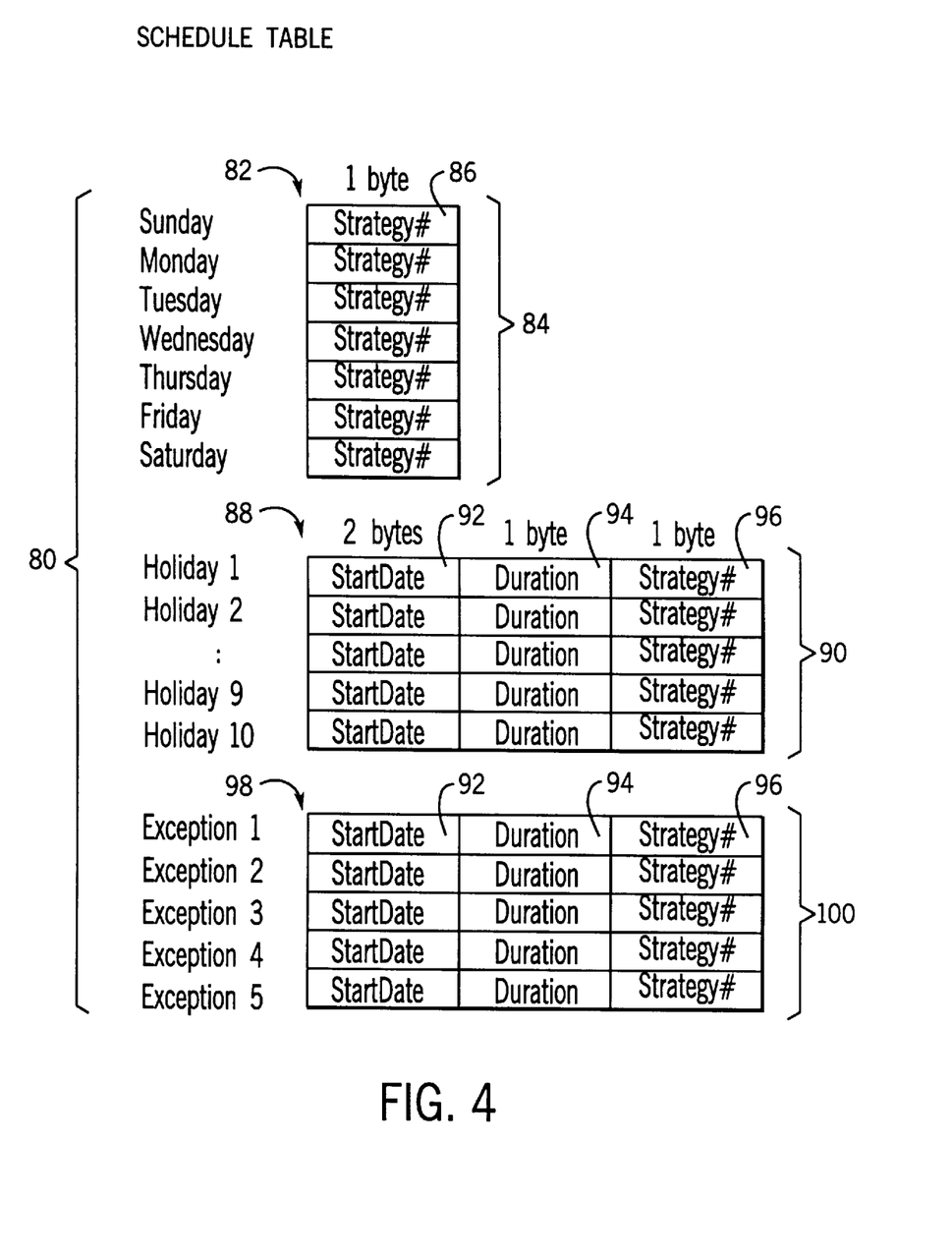
FIG. 4 is a diagram of the schedule data structure which may be defined using the programming tool and stored within the schedule database for execution by the controller.

Turning now to FIG. 4, the schedule data structure associated with the preferred embodiment of the present invention is shown. The schedule data structure along with the strategy table 60 are downloaded and edited by the programming tool 20 and then uploaded back to the schedule database 14 as shown in FIG. 1. Once created and stored, the schedule database 14 can be accessed by processor 16 so that the operating schedule defined by schedule data structure 80 can be executed for operating controller 10. As disclosed, the schedule data structure 80 includes a weekly schedule 82 comprising a single column table of storage cells 84. Each of the seven cells 84 (one cell for each day) stores a strategy number 86 which corresponds to one of the numbered positions or pre-programmed validated strategies 62 stored in the strategy table 60. Accordingly, the particular strategy 62 represented by an event array 66 or 76 which is to be executed on a particular day is programmed into the appropriate cell 84. In the disclosed embodiment, the acceptable values for strategy number 86 are the integers one (1) through five (5), as defined by the NumStrategies variable 36 (FIG. 2). The daily strategy cells 84 in the daily schedule table 82 cannot be empty.

The schedule data structure 80 also includes a holiday schedule table 88 which stores up to ten holiday records 90 for holidays or other re-occurring calendar events having fixed dates for implementing a different strategy 62 (reiterating that a strategy is a validated sequence of events). Each holiday record 90 comprises a two byte StartDate field 92, a one byte Duration field 94, and a one byte Strategy number field 96. The schedule data structure 80 finally includes an exception schedule table 98 which is used to store up to five exception records 100 relating to dates of floating holidays, or other dates for implementing a different strategy 62. In a similar manner, each exception record 100 also comprises a two byte StartDate field 92, a one byte Duration field 94, and a one byte Strategy number field 96. For holidays and exceptions the StartDate field 92 is coded in two hexadecimal bytes as month:day, and the Duration field 94 is coded as one hexadecimal byte as days. As part of the present invention, the Duration field 94 and programming convention assumes that February always has 29 days. Finally, the strategy number field 96 is coded as a one hexadecimal byte with the appropriate strategy number. Exceptions defined within exception schedule table 98 are treated similar to holidays defined within holiday schedule table 88 except that the processor 16 executing the schedule 14 deletes exception records 100 from schedule data structure 80 after they have passed. Empty holiday and exception entries have a NULL (i.e. 0x0000) StartDate field 92.

As part of the programming sequence, the algorithm associated with programming tool 20 prompts the system operator for the start date and the end date for every strategy to be scheduled within tables 88, 98. The start date is then stored within StartDate field 92, and the algorithm computes the duration based upon the end date, and stores this value within Duration field 94. The algorithm also accounts for the 29 day February programming scheme when computing the duration. As will be appreciated, a small amount of data compression is achieved through eliminating an end date field because the total number of bytes required by StartDate field 92 and Duration field 94 is 3 bytes, as opposed to requiring 4 bytes for start date and end date.

Figure 5:
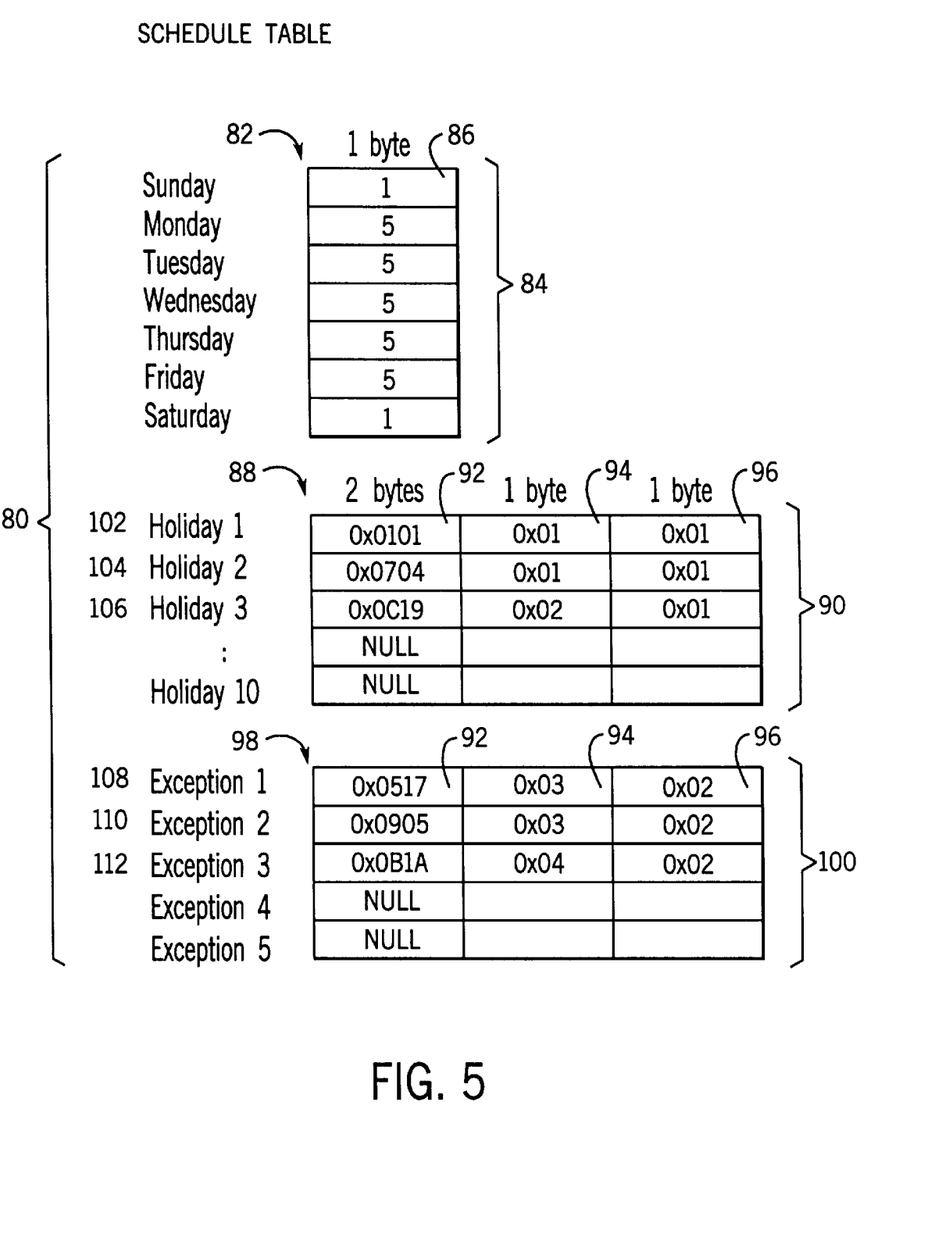
FIG. 5 is a diagram of the schedule data structure shown with exemplary strategies programmed therein.

With reference to FIG. 5, the schedule data structure 80 is shown with exemplary data for demonstrating the information in which schedule data structure 80 may contain. More specifically, the weekly schedule table 82 is programmed to execute strategy number five (5) during the weekdays, and execute strategy number one (1) on weekends. The exemplary holiday schedule table 88 is shown as being programmed with three of the fixed date legal holidays 102, 104, 106 recognized within the United States; New Year's Day—January 1 (0x0101 in HEX), Independence Day—July 4 (0x0704 in HEX), and Christmas Day—December 25 (0x0C19 in HEX). On all three of these holidays, strategy number one (1) will be executed. For holidays 102 and 104, the Duration field 94 is set for one day. For holiday 106, the Duration field 94 is set for two days. The exemplary exception schedule table 98 is also shown as being programmed with three of the floating date legal holidays (programmed as exceptions) 108, 110, 112 recognized within the United States during the 1998 calendar year; Memorial Day, Labor Day, and Thanksgiving Day. On all three of these exception dates, strategy number two (2) will be executed. For exceptions 108 and 110, the Duration field 94 is set for three days to account for the weekend days typically associated with these holidays. For exception 112, the Duration field 94 is set for four days, also to account for the weekend days. As will be appreciated, once schedule data structure 80 is defined by programming tool 20, it is uploaded and stored within schedule database 14 for access and execution by processor 16.

Figure 6:
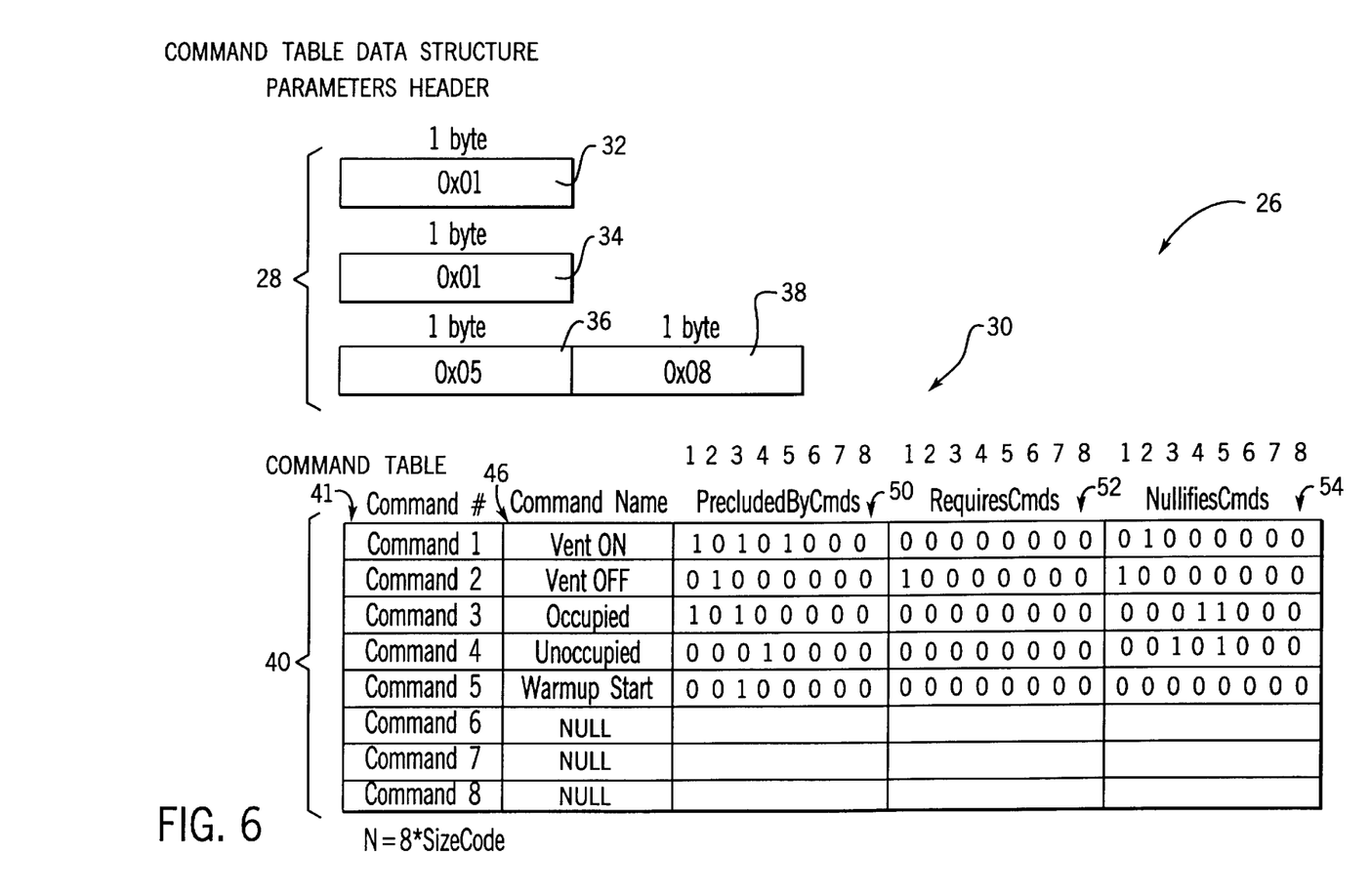
FIG. 6 is a diagram of the command table data structure with an exemplary set of commands and rule definitions contained therein for application by the programming tool.

Referring now to FIG. 6, the command table data structure 26 and more specifically command table 30 is shown as being filled with exemplary data. Of particular importance are the three rule variables 50, 52, 54 which are shown having specific data stored within each associated bit array. More specifically, each rule variable 50, 52, 54 is an N bit array defining the particular context of each rule for a particular command 40. As shown, each bit array includes eight bits, which is derived from N, or 8 * SizeCode (where for purposes of this example SizeCode=1). Accordingly, each position within the bit array stores either a 1 or 0 value. As will be appreciated, the number of bits in each bit array 50, 52, 54 is the same as the number of commands 40 stored within command table 30.

Additionally, each numbered position [n] within each bit array 50, 52, 54 corresponds to a similarly positioned command 40 within command table 30. For example, PrecludedByCmds 50 associated with command one is an 8 bit array filled with the values of 10101000, where the 1 in the n=1 bit array position ([1]) corresponds to command one (vent on), the 0 in the n=2 bit array position ([2]) corresponds to command two (vent off), and so on. The interpretation of PrecludedByCmds bit array 50 is that command one, or the "vent on" command, is precluded by itself (command one), is precluded by command three (occupied) and is also precluded by command five (warm-up start) because a value of 1 is stored in the n=1, n=3, and n=5 bit array positions. This means that if any of these three commands (vent on, occupied, warm-up start) is an active event in effect within the strategy (being programmed by the operator), then command one (vent on) cannot be used (or is precluded from being selected) as the next scheduled event within the strategy, and as any subsequent event until the event precluding it is nullified. Thus, from a review of PrecludedByCmds bit array 50 associated with command one it will be readily appreciated that command one would be precluded by itself, as well as commands three and five. This same interpretation applies for each of the bit arrays associated with the PrecludedByCmds rules 50 for commands two through five 40 of command table 30.

Also by way of example, RequiresCmds 52 associated with command two (vent off) is also an 8 bit array filled with the values 10000000, where the 1 n the n=1 bit array position ([1]) corresponds to command one (vent on), the 0 in the n=2 bit array position ([2]) corresponds to command two (vent off), and so on. The interpretation of RequiresCmds bit array 52 is that command one or the "vent on" command, is required to be active (or in effect) within the sequence of events before command two (vent off) can be selected by the programmer and placed within the sequence of events forming the strategy. As will become apparent, the validation algorithm interprets each bit array for applying the context rules used for validating the selection of each command.

Finally, by way of example, NullifiesCmds 54 associated with command one is also an 8 bit array filled with the values 01000000, where the 1 in the n=2 bit array position ([2]) corresponds to command two (vent off). The interpretation of NullifiesCmds bit array 54 is that command one, or the "vent on" command nullifies or cancels command two (vent off) if it is a subsequent command selected by the operator within the strategy. As part of the present invention, this feature eliminates the need for an extra step of cancelling active commands within the sequence of programmed events forming the strategy. Accordingly, the NullifiesCmds context rule 54 allows a particular command 40 to be selected while simultaneously nullifying or cancelling previous events which may be in effect and would conflict with the currently selected command during execution of the scheduled strategy.

Each of the bit arrays 50, 52, 54 are used within the algorithm of the present invention to validate an operator selected sequence of commands which are programmed as events within a single strategy. The organization of the maximum number of events into a predetermined number of strategies 62 for a specific controller is discussed above. The programming tool 20 is used by the system operator for selecting and validating the sequence of events which comprise a single strategy. The strategies 62 are then used to create the schedule 80 which is uploaded into schedule database 14.

Figure 7:
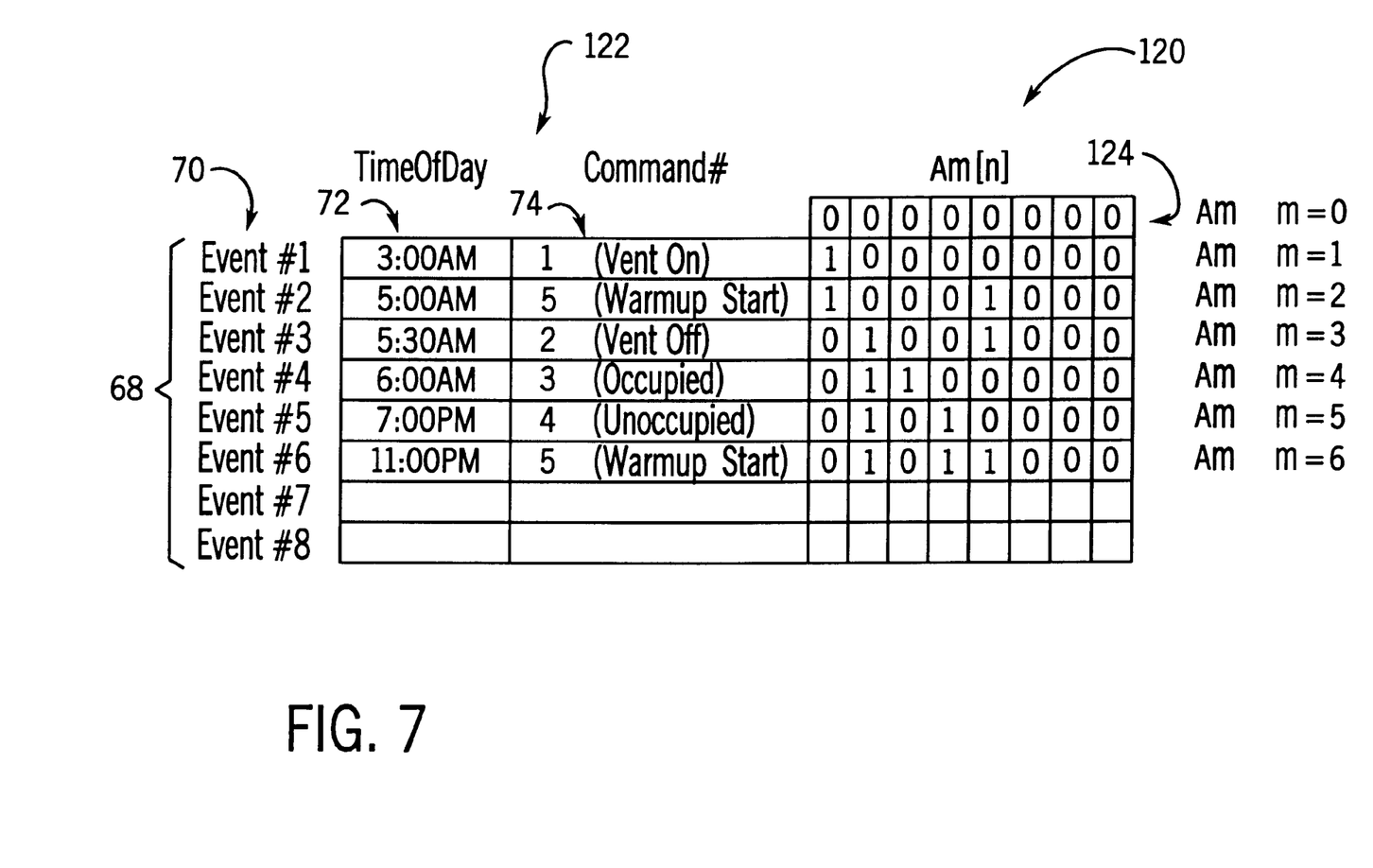
FIG. 7 is a diagram of an exemplary strategy and event data structure shown in conjunction with the state table and validation bit array calculated at each step of the validation portion of the algorithm associated with the present invention.

Referring now to FIG. 7, a sample validation table 120 forming part of validation engine 22 is shown which is used by scheduling tool 20 and validation algorithm 130 for determining whether the sequence of events 68 selected for example into strategy table 122 are programmed in a valid fashion. As described above, each event 68 is defined as a particular command 74 to be executed at a particular time of day 72. One aspect of the validation engine 22 is a rule checking algorithm which compares the bit arrays 50, 52, 54 of the selected command 40 or 74 against its associated reference bit array $A_m$ which is part of state table 120.

Figure 8:
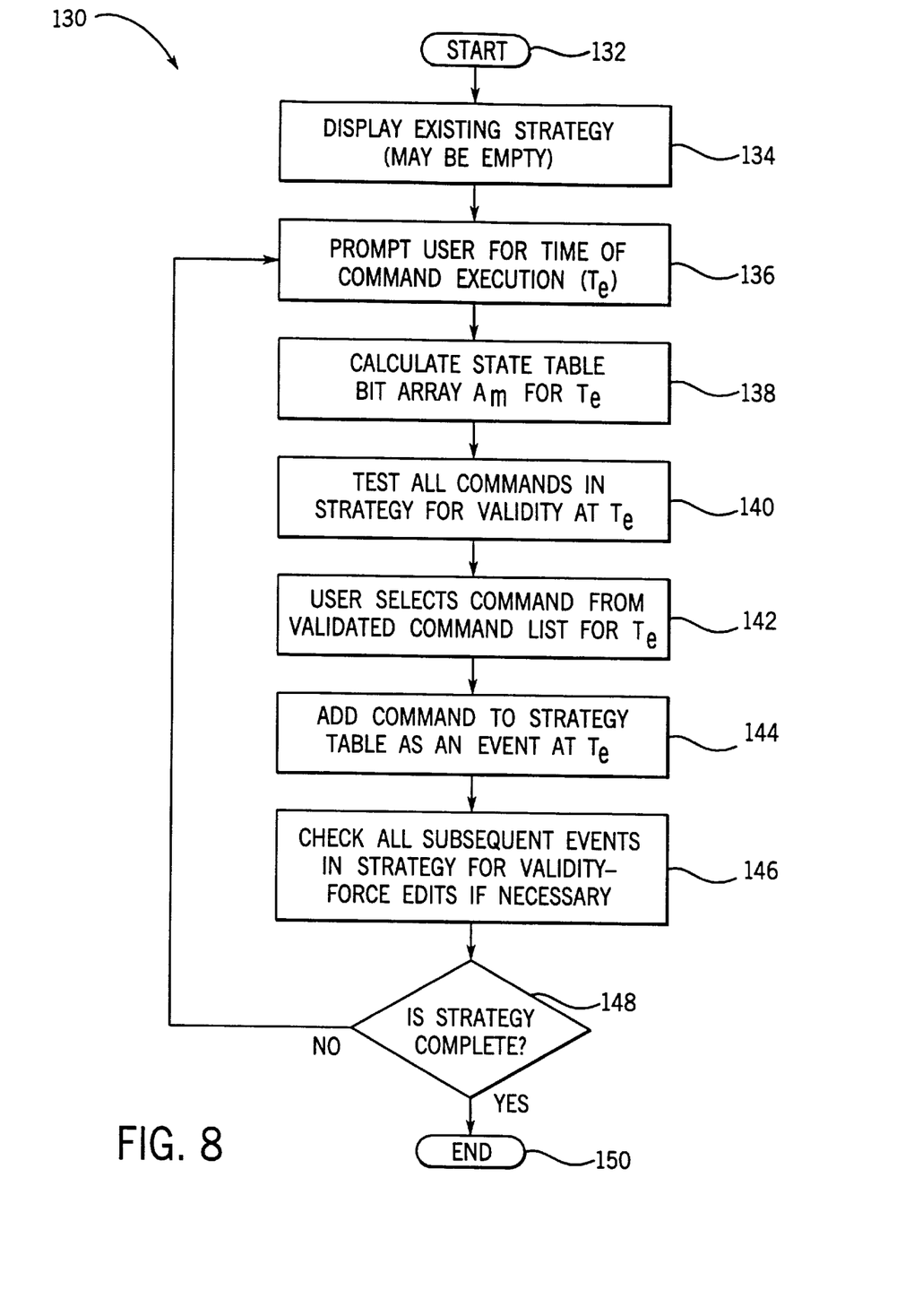
FIG. 8 is a flow chart of the command validation algorithm according to the teachings of the present invention.

A general scheme for the command scheduling and validation algorithm 130 implemented by the validation engine 22 of scheduling tool 20 is shown in FIG. 8. The validation algorithm 130 begins at block 132, and continues at block 134 where one of the existing strategies 62 is displayed on the scheduling tool 20. While it is preferred that controller 10 is shipped from the factory with several pre-programmed strategies 62, the particular strategy displayed may also be empty (i.e. may have no programmed events). As shown at block 136, if the displayed strategy contains a sequence of commands 74, the user is prompted for the time of day $T_e$ in which the particular command is to be executed. If the strategy is empty, the user is prompted for a command and an execution time at block 136. After the user has entered the time of day $T_e$ for that particular command, the algorithm calculates the state table bit array $A_m$ for the command at that time of day $T_e$ at block 138. This calculation at block 138 is performed as follows.

As each command is programmed, each event 70 (or m) within the strategy table 122 has an associated validation table bit array $A_m$ defining which commands are in effect from previously defined events. Referring briefly to FIG. 7, the first array $A_m$ within table 120 is $A_0$ 124 (where m=0), in which all bits within $A_0$ 124 are clear (reset to 0) since there are no commands in effect previous to event m=0. The validation bit array $A_m$ for each subsequent event position (m=1, m=2, m=3, etc.) is a function of the previous validation bit array $A_{m-1}$ for the previous event, and the command E[m-1] (or Event [m-1]) used in that previous event as follows:

$$A_m = (A_{m-1} \ \& \ \sim X_{E[m-1]}) \ | \ n_{E[m-1]} \qquad \text{Formula 1}$$

The interpretation of Formula 1 is as follows. The validation bit array $A_m$ is defined by a bitwise AND operation between $A_{m-1}$ and the compliment $\sim X_{E[m-1]}$ of the NullifiesCmds bit array 54 associated with the command belonging to the event at position [m-1]. The result of this bitwise AND operation is then used in a subsequent bitwise OR operation with the array $n_{E[m-1]}$, where $n_i$ is a bit array of N elements (8 elements in this example) in which each bit is 0 except the $i^{th}$ bit, which is set to 1. Accordingly, if command one is chosen, position one (n=1) in the bit array $n_i$ is set to 1 and all other bits are zero. Likewise, if command five is chosen, the bit in position five is set to 1 and all other bits are zero.

As shown in FIG. 7, a new state table bit array $A_m$ is computed every time a subsequent command/event is selected or modified for the particular strategy (or sequence of events) being formulated by the operator using scheduling tool 20. After the array $A_m$ is computed using Formula 1, the validity of all of the commands within the strategy, and the execution time of day $T_e$ for each command is tested at block 140. As part of the command validation subroutine at block 140, the algorithm reads the current state table bit array $A_m$. The command validation subroutine continues at block 140 by applying the context rules 48 associated with each command against its associated state table bit array $A_m$ according to the following criteria:

$$P_n \ \& \ A_m = 0, \ \text{(where 0 is a bit array of N elements all 0)} \qquad \text{Formula 2}$$

and $$R_n \ \& \ A_m = R_n \qquad \text{Formula 3}$$

According to Formula 2, the validity of the selected command/event is verified by a bitwise AND operation between the PrecludedByCmds bit array 50 ($P_n$) of the selected command and the current $A_m$ validation bit array. If this bitwise AND operation produces a bit array of N elements in which each element in the bit array is 0, then the first step required for validating the selected command/event is complete.

According to Formula 3, the second validation step involves a bitwise AND operation between the RequiresCmds bit array 52 ($R_n$) of the selected command and the current validation bit array $A_m$. If this bitwise AND operation produces the same RequiresCmds bit array 52, then the second validation step is complete and the selected command/event within the strategy 62 is determined to be valid.

Once all of the commands within the strategy are validated at block 140, control passes to block 142. At block 142 the user is supplied with a list of validated commands which can be programmed into the strategy 62 at that particular location in the sequence. The user is then able to select a command from the valid command list for the desired execution time $T_e$. At block 144, the selected command and execution time $T_e$ are added to the strategy as an event. At block 146, all of the subsequent commands/events in the strategy 62 are checked for validity. If any of the subsequent events are found to be invalid, algorithm 130 will force these invalid events to be correctly edited or deleted.

The validation algorithm 130 implemented by validation engine 22 also has the capability to examine all of the possible commands and filter the commands to generate a list of remaining valid choices for a position in the strategy within the user interface. This function is represented at block 146. This feature greatly simplifies the task of selecting a valid sequence of commands, since only valid commands are presented for selection. For example, if the algorithm determines that command one (vent on) has already been selected, command one will no longer appear in the list of commands available for selection until the command precluding command one is no longer in effect.

As indicated at block 148, the rule checking and command validation algorithm of the present invention is repeated (returns control to block 136) as each command/event is programmed or modified for the particular daily strategy 62, until the desired sequence of events 68 is programmed into event array 122, 66, 76. Once all of the desired strategies 62 are programmed using scheduling tool 20, the algorithm ends at block 150, and the schedule table 80 and the strategy table 60 which include all of the validated event sequences for each strategy, are uploaded into schedule database 14. Once the programming tool 20 has completed uploading information to the schedule database 14, processor 16 can read the schedule which now includes validated strategies for executing the schedule of daily strategies 62 within controller 10.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A memory for storing a data structure defining command data and schedule data for operating a controller comprising:

a variable length command table data structure for storing a set of executable commands, each of the commands having at least one context rule for defining the use of the command with respect to a sequence of selected commands;

said command table data structure including a first variable specifying the quantity of daily strategies, and a second variable specifying the quantity of commands which may be used within a strategy, a command identification field associated with each command in the command table data structure; and a strategy table data structure containing a plurality of daily strategies each of which defines how to operate the controller on a different day that is specified.

2. The memory of claim 1 wherein each command includes a context rule defining which commands, when active, preclude the command from being selected into a sequence of commands defining a set of events within the strategy.

3. The memory of claim 2 wherein the context rule is an N element bit array where N is also the number of commands within the command table.

4. The memory of claim 1 wherein each command includes a context rule defining which commands are required to be active prior to the command being selected into a sequence of commands defining a set of events within the strategy.

5. The memory of claim 4 wherein the context rule is an N element bit array where N is also the number of commands within the command table.

6. The memory of claim 1 wherein each command includes a context rule defining which commands, if previously in effect, will be nullified by the current command being selected into a sequence of commands defining a set of events within the strategy.

7. The memory of claim 6 wherein the context rule is an N element bit array where N is also the number of commands within the command table.

8. The memory of claim 1 further including a schedule table data structure for storing the schedule data, the schedule table data structure including a weekly schedule table for storing a set of weekly strategies, a holiday schedule table for storing a set of holiday strategies, and an exception schedule table for storing a set of exception strategies.

9. The memory of claim 1 wherein a variable N has a value that equals the number of commands, and wherein N is defined by 8 times the second variable of the command table data structure.

10. A system including a tool for programming a controller with a sequence of events which are selected by a system operator comprising:

a data structure for storing a set of commands which can be executed by the controller, each of the commands having at least one context rule for defining the use of the command with respect to a sequence of selected commands;

a validation engine associated with the tool, the validation engine maintaining a state table for tracking an outcome associated with the sequence of events, and the validation engine implementing a validation algorithm for validating the sequence of events; and an interface for providing data flow between the controller and the tool, whereby the validation engine gains access to the data structure for allowing the system operator to create the sequence of events, and for allowing the validation engine to apply the validation algorithm against the at least one context rule of each of the commands within the sequence of events.

11. The system of claim 10 wherein each command within the data structure includes three context rules.

12. The system of claim 10 wherein each of the commands includes a context rule defining which commands, when active, preclude the command from being selected into the sequence of selected commands defining a strategy.

13. The system of claim 12 wherein the context rule is an N element bit array where N is also the number of commands within the data structure.

14. The system of claim 10 wherein each of the commands includes a context rule defining which commands are required to be active prior to the command being selected into the sequence of selected commands defining a strategy.

15. The system of claim 14 wherein the context rule is an N element bit array where N is also the number of commands within the data structure.

16. The system of claim 10 wherein each of the commands includes a context rule defining which commands, if previously in effect, will be nullified by the current command being selected into the sequence of selected commands defining a strategy.

17. The system of claim 16 wherein the context rule is an N element bit array where N is also the number of commands within the data structure.

18. A method for validating a sequence of events forming a strategy within a schedule for use with a controller comprising the steps of:

providing a command table for storing a plurality of commands, said command table including a data structure having a command identification field and a plurality of command rule fields for defining context rules associated, with each command;

accessing the command table with a controller independent scheduling tool for interpreting the commands and applying the context rules associated with each command for creating a strategy;

selecting a command from the command table and associating the command with an execution time for defining an event within the strategy;

validating each command within the strategy by applying a validation algorithm to the command rule fields of each command;

repeating the steps of selecting and validating for creating said sequence of events until at least one validated strategy is defined;

organizing the strategies into a schedule table;

providing a processor within the controller for interpreting the schedule table; and executing the strategy stored in the schedule table for operating the controller.

19. The method of claim 18 further including the step of maintaining a state table which is updated by the validation algorithm, the state table tracking the current state of the commands within the strategy.

20. The method of claim 18 wherein the plurality of command rule fields is defined by three command context rule fields.

* * * * *